United States Patent
Koue (10) Patent No.: US 9,030,700 B2
(45) Date of Patent: May 12, 2015

(54) RELAY DEVICE, FACSIMILE COMMUNICATION METHOD, AND RECORDING MEDIUM

(71) Applicant: Fuji Xerox Co., Ltd., Tokyo (JP)

(72) Inventor: Toshiaki Koue, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/022,842

(22) Filed: Sep. 10, 2013

(65) Prior Publication Data

US 2014/0268249 A1    Sep. 18, 2014

(30) Foreign Application Priority Data

Mar. 12, 2013   (JP) .................................. 2013-049543

(51) Int. Cl.
*G06F 3/12*      (2006.01)
*H04N 1/32*     (2006.01)

(52) U.S. Cl.
CPC .................................. *H04N 1/32427* (2013.01)

(58) Field of Classification Search
CPC .......... H04N 1/00209; H04N 1/00214; H04N 1/00127; H04N 1/32406; H04N 1/32411; H04L 12/5855
USPC ............... 358/1.15, 1.13, 405, 407, 434, 438; 709/203, 232, 239, 240
See application file for complete search history.

(56) References Cited

U.S. PATENT DOCUMENTS

| 5,917,615 A * | 6/1999 | Reifman et al. .............. 358/468 |
| 6,897,985 B1 * | 5/2005 | Toyoda ......................... 358/402 |
| 7,177,936 B1 * | 2/2007 | Ejiri .............................. 709/228 |
| 2004/0024829 A1 * | 2/2004 | Tanimoto ..................... 709/206 |

FOREIGN PATENT DOCUMENTS

JP     A-2006-222635     8/2006

* cited by examiner

*Primary Examiner* — Jamares Q Washington
(74) *Attorney, Agent, or Firm* — Oliff PLC (57) ABSTRACT

A relay device includes a receiver that receives facsimile transmission instructions via a private network from a client device that does not include facsimile transmitting functions, a facsimile communication unit that transmits a facsimile externally via a public network, on the basis of the facsimile transmission instructions received by the receiver, a determiner that, on the basis of the content of the facsimile transmission instructions received by the receiver, determines whether or not to request another device connected via the private network to execute facsimile transmission, and a requester that, in the case where the determiner determines to request another device to execute facsimile transmission, sends a transmission request regarding some or all of the facsimile transmission instructions received by the receiver to another device.

7 Claims, 5 Drawing Sheets

| FORWARDING DEST. DEVICE ID | FORWARDING DEST. IP ADDRESS | PHONE NUMBER |
|---|---|---|
| 003 | 192. 168. 1. 20 | 03-XXXX-AAAA |
| 005 | 192. 168. 1. 21 | 045-YYY-BBBB |
| 007 | 192. 168. 1. 25 | 096-ZZZ-CCCC |
| ⋮ | ⋮ | ⋮ |

| DESTINATION | SUCCESS RATE |
|---|---|
| 03-XXXX-1234 | 100% |
| 045-XXYY-0000 | 80% |
| 07-ZZZZ-1111 | 10% |
| ⋮ | ⋮ |

FIG. 6

RELAY DEVICE, FACSIMILE COMMUNICATION METHOD, AND RECORDING MEDIUM

CROSS-REFERENCE TO RELATED APPLICATIONS

This application is based on and claims priority under 35 USC 119 from Japanese Patent Application No. 2013-049543 filed Mar. 12, 2013.

BACKGROUND

1. Technical Field

The present invention relates to a relay device, a facsimile communication method, and a recording medium.

2. Summary

According to an aspect of the invention, there is provided a relay device that includes a receiver that receives facsimile transmission instructions via a private network from a client device that does not include facsimile transmitting functions, a facsimile communication unit that transmits a facsimile externally via a public network, on the basis of the facsimile transmission instructions received by the receiver, a determiner that, on the basis of the content of the facsimile transmission instructions received by the receiver, determines whether or not to request another device connected via the private network to execute facsimile transmission, and a requester that, in the case where the determiner determines to request another device to execute facsimile transmission, sends a transmission request regarding some or all of the facsimile transmission instructions received by the receiver to another device.

BRIEF DESCRIPTION OF THE DRAWINGS

An exemplary embodiment of the present invention will be described in detail based on the following figures, wherein.

DETAILED DESCRIPTION

Exemplary Embodiment

Configuration of Communication System

Figure 1:
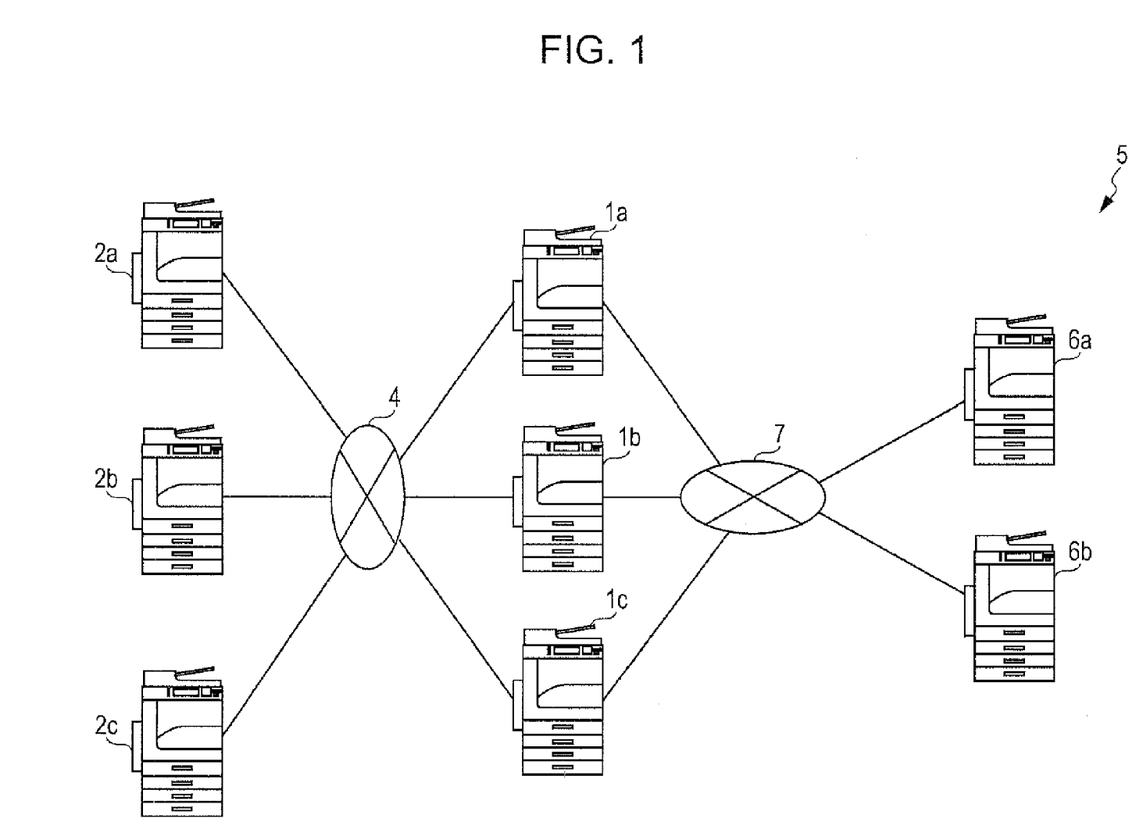
FIG. 1 is a schematic diagram illustrating an exemplary configuration of a communication system according to an exemplary embodiment of the present invention.

FIG. 1 is a schematic diagram illustrating an exemplary configuration of a communication system according to an exemplary embodiment of the present invention.

In the communication system 5, relay devices 1a to 1c and client devices 2a to 2c are communicably connected to each other by a private network 4. In addition, the relay devices 1a to 1c are communicably connected to external devices 6a and 6b via a public network 7, with information being transmitted and received between the external devices 6a and 6b by facsimile (hereinafter called "fax").

The relay devices 1a to 1c are devices that include fax transmitting and receiving functions as well as printer, scanner, and copier functions, and are equipped with electronic components such as a central processing unit (CPU) and flash memory that include functions for processing information. Although the relay devices 1 are able to transmit faxes by themselves, this exemplary embodiment will describe the case of transmitting a fax according to fax transmission instructions from the client devices 2a to 2c on the basis of the Internet Fax (iFax) standard.

The client devices 2a to 2c are devices that include printer, scanner, and copier functions, but do not include fax transmitting and receiving functions, and are equipped with electronic components such as a CPU and flash memory that include functions for processing information. The client devices 2a to 2c send fax transmission instructions to the relay devices 1.

The private network 4 is a communication network capable of high-speed communication, and is a wired or wireless communication network such as an intranet or local area network (LAN).

The external devices 6a and 6b are arbitrary information processing devices that include fax transceiving functions, such as printers or PCs, for example.

The public network 7 is, for example, a paid communication network operated by a communication company, and may be an external network such as the public switched telephone network (PSTN) or a public IP network.

Hereinafter, a case will be described in which the client devices 2a to 2c send fax transmission instructions to the relay devices 1a to 1c, causing faxes to be transmitted and received to and from multiple destinations.

Figure 2:
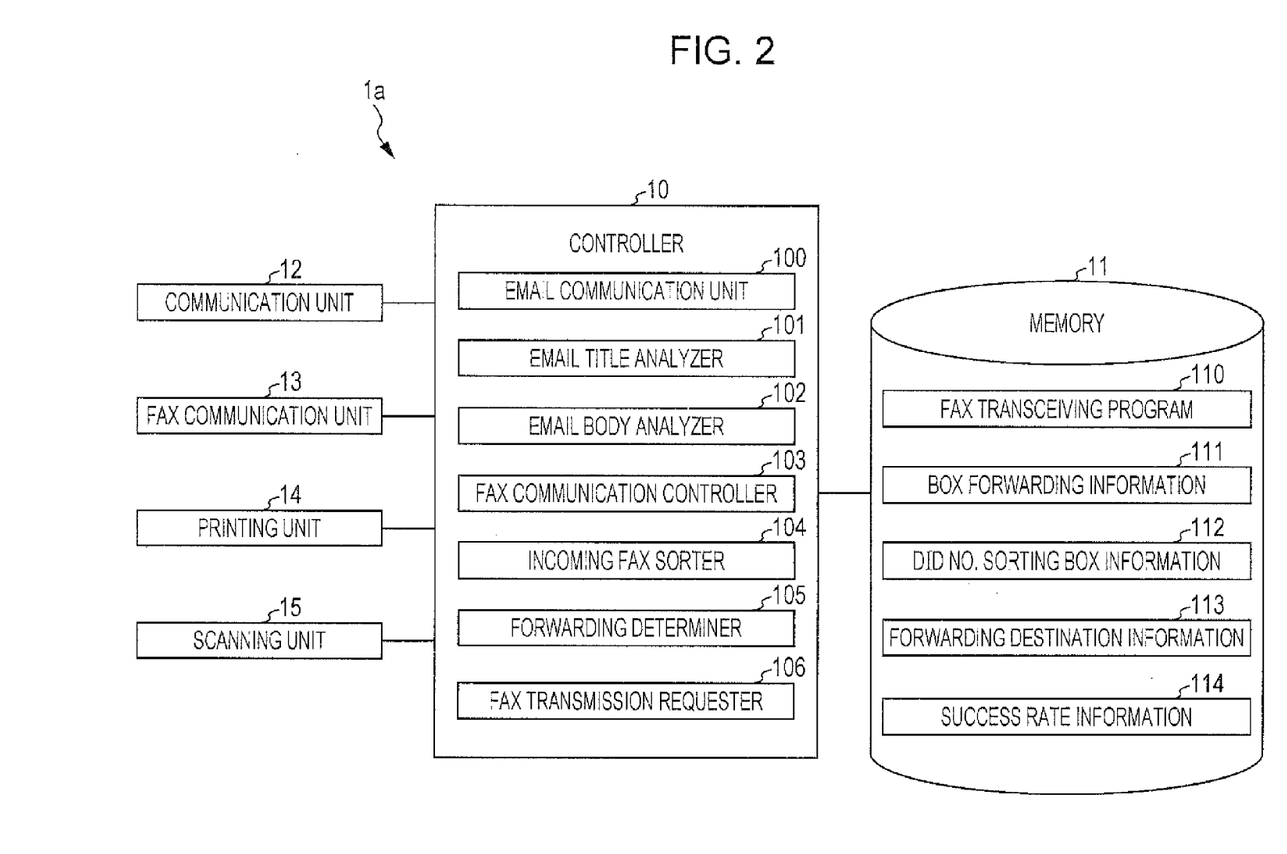
FIG. 2 is a block diagram illustrating an exemplary configuration of a relay device.

FIG. 2 is a block diagram illustrating an exemplary configuration of the relay device 1a. Note that since the relay devices 1a to 1c have a shared configuration, the relay device 1a will be described as a representative example.

The relay device 1a is equipped with a controller 10, made up of a CPU or the like, that controls respective units in addition to executing various programs, memory 11 made up of a memory medium such as flash memory that stores information, a communication unit 12 that communicates with external devices via the private network 4, a fax communication unit 13 that communicates by fax with external devices via the public network 7, a printing unit 14 that prints onto a paper sheet, and a scanning unit 15 that optically scans a paper sheet having information such as text and images written thereon. The relay device 1a may additionally include a display that displays information such as text and images, and an operating unit used to operate the relay device 1a.

By executing a fax transceiving program 110 discussed later, the controller 10 functions as an email communication unit 100, an email title analyzer 101, an email body analyzer 102, a fax communication controller 103, an incoming fax sorter 104, a forwarding determiner 105, a fax transmission requester 106, and the like.

The email communication unit 100 transmits and receives email to and from the client devices 2a to 2c via the private network 4. The email communication unit 100 also functions as a receiver that receives emails including Internet fax transmission instructions in particular.

The email title analyzer 101 analyzes information such as the destination of a fax transmission from Internet fax transmission instructions included in the title of an email received by the email communication unit 100.

The email body analyzer 102 analyzes the body text of an email received by the email communication unit 100 to extract fax transmission settings. For example, the email body analyzer 102 analyzes information such as settings for broadcasting the same document to multiple destinations, and settings indicating prioritized transmission.

The fax communication controller 103 controls the fax communication unit 13 to transmit and receive a document in fax format.

The incoming fax sorter 104 sorts a document received via the fax communication unit 13 into a sorting box according to the destination of that document. Note that the relay device 1a is assumed to be able to receive faxes with multiple phone numbers set as destinations.

The forwarding determiner 105, in cases such as the case of receiving multiple fax transmission instructions, for example, determines whether or not to request another relay device 1b or 1c to execute fax transmission, and also which relay device 1b or 1c to forward to, on the basis of conditions discussed later.

The fax transmission requester 106, in the case where the forwarding determiner 105 determines to request another relay device 1b or 1c to execute fax transmission, transmits fax transmission instructions and a document to the relay device 1b or 1c set as the forwarding destination, and requests fax transmission.

The memory 11 stores information such as the fax transceiving program 110 that causes the controller 10 to operate as the respective units 100 to 106 discussed above, box forwarding information 111, direct inward dialing (DID) number sorting box information 112, forwarding destination information 113, and success rate information 114.

The box forwarding information 111 is information that associates identifiers for sorting boxes that temporarily save documents received as faxes with the IP addresses of forwarding destinations (the client devices 2a to 2c) assigned to each sorting box.

The DID number sorting box information 112 is information that associates phone numbers, which are destinations for documents received as faxes, with identifiers for sorting boxes. Note that this configuration assumes that multiple phone numbers are registered in DID format in a relay device, and that the registered numbers are respectively associated with the client devices 2a to 2c.

The forwarding destination information 113 is information related to the other relay devices 1b and 1c that include fax transmitting functions.

The success rate information 114 is information indicating the success rate of previous fax transmissions from the relay device 1a to a specific destination.

The communication unit 12 transmits and receives data via the private network 4 according to a communication protocol such as TCP/IP, performing network-related control and controlling the transmitting and receiving of email.

The fax communication unit 13 includes the functionality of a modem that modulates and demodulates image data according to a facsimile protocol such as G3 or G4, and the functionality of an NCU that controls connections with the public network 7, and conducts fax communication via the public network V.

Figure 3:
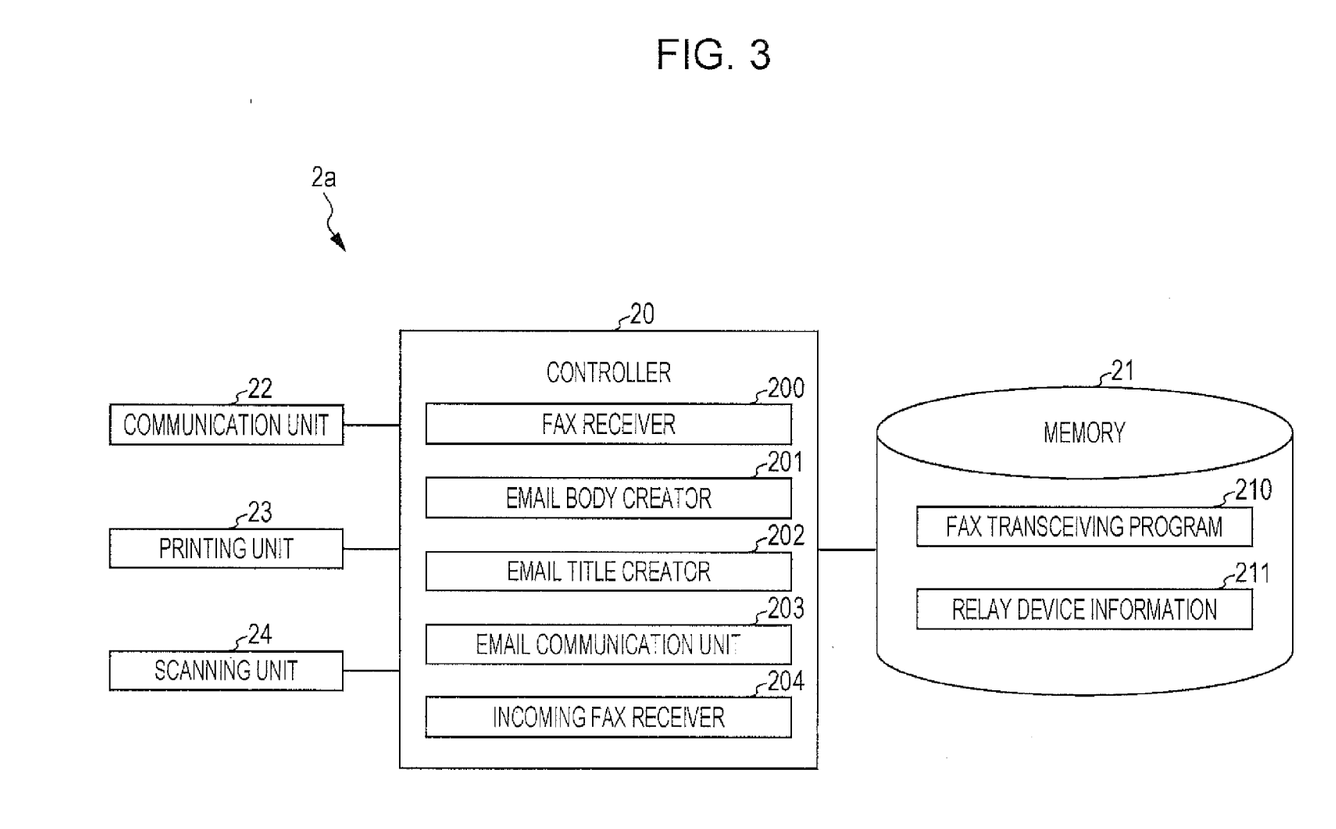
FIG. 3 is a block diagram illustrating an exemplary configuration of a client device.

FIG. 3 is a block diagram illustrating an exemplary configuration of the client devices 2a to 2c. Since the configuration of the client devices 2a to 2c is shared, the client device 2a will be described as a representative example.

The client device 2a is equipped with a controller 20, made up of a CPU or the like, that controls respective units in addition to executing various programs, memory 21 made up of a memory medium such as flash memory that stores information, a communication unit 22 that communicates with external devices via the private network 4, a printing unit 23 that prints onto a paper sheet, and a scanning unit 24 that optically scans a paper sheet having information such as text and images written thereon. The client device 2a may additionally include a display that displays information such as text and images, and an operating unit used to operate the client device 2a.

By executing a fax transceiving program 210 discussed later, the controller 20 functions as a fax receiver 200, an email body creator 201, an email title creator 202, an email communication unit 203, an incoming fax receiver 204, and the like.

The fax receiver 200 receives a fax transmission request from the user of the client device 2a. Note that a fax transmission request is input together with a destination phone number as a result of the user operating an operating unit (not illustrated), while a document to be faxed is scanned by the scanning unit 24.

The email body creator 201 creates the body text of an email to be transmitted to a relay device 1, on the basis of a fax transmission request and a destination phone number received by the fax receiver 200.

The email title creator 202 creates the title of an email to be transmitted to a relay device 1, on the basis of a fax transmission request and a destination phone number received by the fax receiver 200.

The email communication unit 203 transmits and receives email to and from the relay devices 1 via the private network 4.

The incoming fax receiver 204 receives, via the private network 4, image information saved to a sorting box corresponding to the client device 2a from among the image information of received documents temporarily saved in the relay device 1.

The memory 21 stores information such as the fax transceiving program 210 that causes the controller 20 to operate as the respective units 200 to 204 discussed above, and relay device information 211.

The relay device information 211 is information on the IP address of a relay device to which the client device 2a is able to transmit fax transmission instructions.

(Operation of Communication System)

Hereinafter, operation of a communication system 5 according to the exemplary embodiment will be described with reference to FIGS. 1 to 6, with the description divided into (1) basic operation, (2) fax forwarding operation, and (3) forwarding determination operation. Note that the case of the client device 2a transmitting faxes by broadcast transmission via the relay device 1a will be described as representative of the client devices 2a to 2c.

(1) Basic Operation

First, a user of a client device 2a operates an operating unit (not illustrated) of the client device 2a, and prepares a fax.

The fax receiver 200 of the client device 2a starts receiving a fax transmission request in response to the user operations, and receives a destination phone number while also prompting the user to place a document to be faxed on a platen of the scanning unit 24 of the client device 2a.

The user inputs a destination phone number, and in addition, places a document on the platen and operates the operating unit to cause the scanning unit 24 to scan the document.

The fax receiver 200 of the client device 2a optically scans the document with the scanning unit 24 and generates image information.

Next, the email body creator 201 creates the body text of an email to be transmitted to the relay device 1a, on the basis of a fax transmission request and a destination phone number received by the fax receiver 200. For example, information indicating broadcast transmission or information indicating a priority ranking of multiple destinations may be input into the body text.

In addition, the email title creator 202 creates the title of an email to be transmitted to the relay device 1a, on the basis of a fax transmission request and a destination phone number received by the fax receiver 200.

The email title states "FAX-044BBB1111@ [192.168.1.33]", for example. This indicates that fax transmission instructions with respect to the phone number "044BBB1111" are sent to the relay device 1a at the IP address "192.168.1.33". Note that in the case of broadcast transmission, there are actually multiple destination phone numbers.

Next, the email communication unit 203 attaches image information to the email created by the email body creator 201 and the email title creator 202, and transmits the resulting email to the relay device 1a.

The email communication unit 100 of the relay device 1a receives the email transmitted by the client device 2a, and the email title analyzer 101 analyzes the email title "FAX-044BBB1111@[192.168.1.33]" and recognizes that "044-BBB-1111" is the destination fax number. Note that in the case of broadcast transmission, there are actually multiple destination phone numbers.

Next, the fax communication controller 103 transmits a fax of the image information attached to the email to the phone number "044-BBB-1111".

In addition to the basic operation above, in the case where conditions discussed later are met, the relay device 1a forwards all or part of the fax transmission instructions that the relay device 1a has received to another relay device 1b or 1c, and requests fax transmission.

(2) Fax Forwarding Operation

Figure 6:
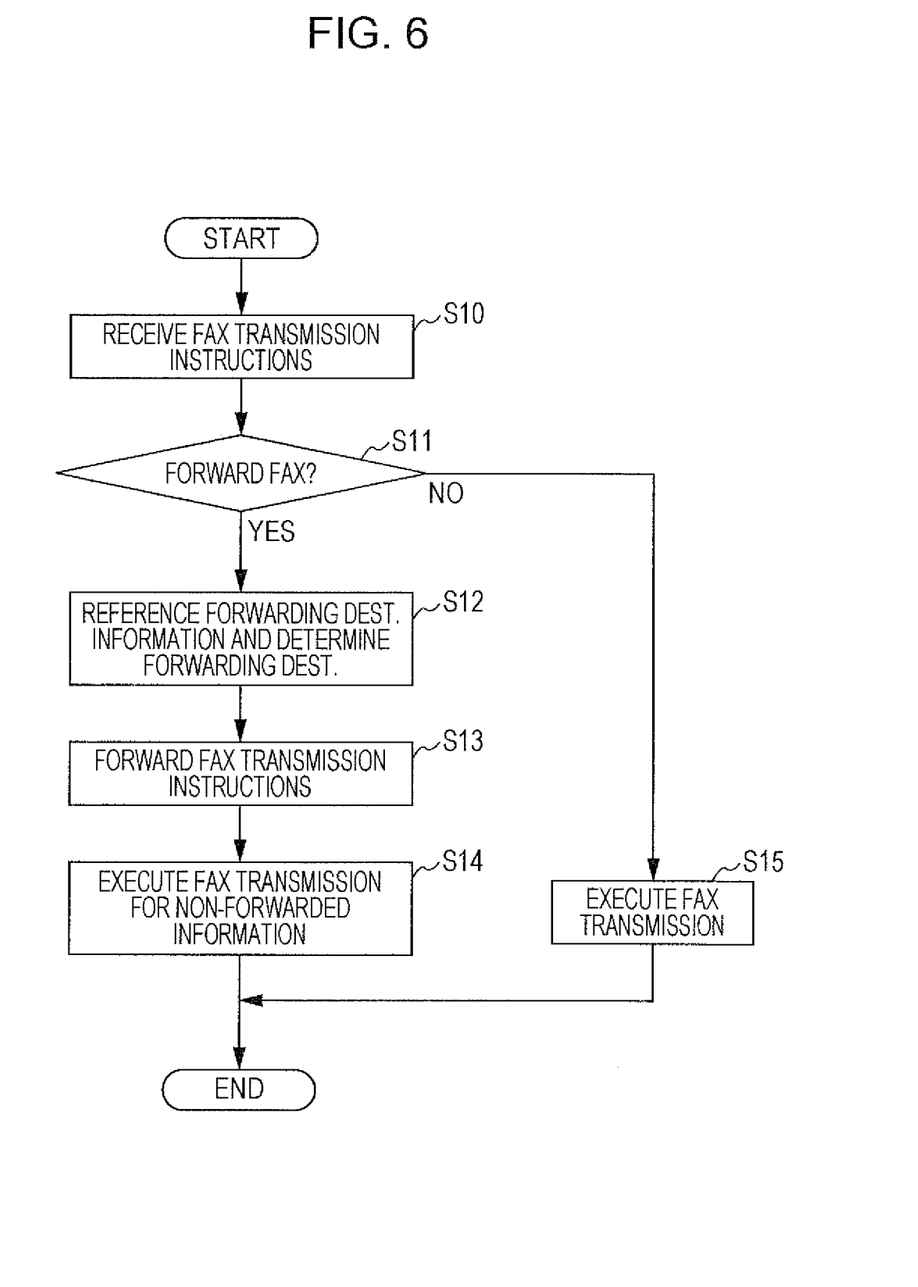
FIG. 6 is a flowchart illustrating an example of fax forwarding operation by a relay device.

FIG. 6 is a flowchart illustrating an example of fax forwarding operation by a relay device.

First, if the email communication unit 100 of the relay device 1a receives fax transmission instructions from the client device 2a (S10), the forwarding determiner 105 determines whether or not to request another relay device 1b or 1c to execute fax transmission on the basis of the "(3) Forwarding determination operation" discussed later (S11).

In the case of determining to request fax transmission (S11; Yes), the forwarding determiner 105 references the forwarding destination information 113 and determines whether to forward to the relay device 1b or 1c (S12).

Figure 4:
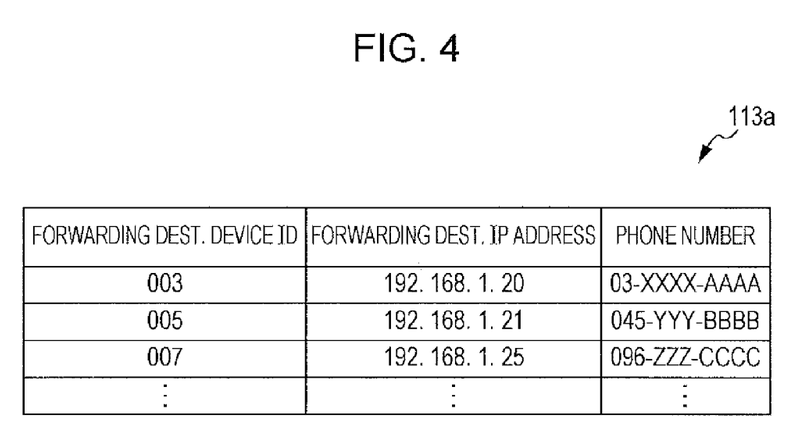
FIG. 4 is a diagram illustrating an example of the structure of forwarding destination information.

FIG. 4 is a diagram illustrating an example of the structure of the forwarding destination information 113.

The forwarding destination information 113a illustrated in FIG. 4 is an example of forwarding destination information 113, and is information related to other relay devices that include fax transmitting functions. The forwarding destination information 113a includes a forwarding destination device ID that indicates an identifier for a relay device, a forwarding destination IP address that indicates an IP address assigned to a relay device, and a phone number indicating a phone number assigned to a relay device.

The question of which forwarding destination is requested to execute fax transmission will be discussed in "(3) Forwarding determination operation".

Note that the forwarding destination information 113a may be registered in the relay device 1a in advance, or acquired by querying the other relay devices 1b and 1c connected to the relay device 1a via the private network 4 during the initialization of the respective units, such as when powering on the relay device 1a.

Next, the fax transmission requester 106 forwards fax transmission instructions to the forwarding destination determined by the forwarding determiner 105 (S13).

Note that the fax transmission requester 106 forwards fax transmission instructions by transmitting the document and destination information of fax transmission instructions received by the relay device 1a from the client device 2a to another relay device 1b or 1c via the private network 4 using a protocol such as email or FTP.

Next, the fax communication controller 103 executes fax transmission similarly to "(1) Basic operation" for non-forwarded destinations. Additionally, the other relay device 1b or 1c that has received forwarded fax transmission instructions executes fax transmission similarly to "(1) Basic operation".

Also, in the case where the forwarding determiner 105 determines in step S11 to not request another relay device 1b or 1c to execute fax transmission (S11; No), the fax communication controller 103 executes fax transmission similarly to "(1) Basic operation" (S15).

(3) Forwarding Determination Operation

Hereinafter, the operation by which the forwarding determiner 105 determines whether or not to request another relay device 1b or 1c to execute fax transmission in step S11 will be described in detail.

(3-1)

As an example, in the case where the received fax transmission instructions are instructions for broadcast transmission that transmits the same document to multiple destinations, the forwarding determiner 105 determines to request one other relay device to execute fax transmission of half of the multiple destinations. Fax transmission may also be requested such that the destinations are divided equally or unequally among all other relay devices.

(3-2)

Also, as another example, in the case where the relay device 1a receives multiple fax transmission instructions, and the number of received instructions exceeds a predetermined number, the forwarding determiner 105 determines to request an arbitrary other relay device to execute fax transmission of the exceeding portion.

Note that a request from the relay device 1a may also be denied in the case where another relay device 1b or 1c receives a fax transmission request from the relay device 1a, and the number of fax transmission instructions received at the other relay device 1b or 1c itself exceeds a predetermined number. The denied fax transmission request is resent to another relay device by the relay device 1a.

(3-3)

Also, as another example, in the case where a priority ranking is set for multiple destinations at the client device 2a, the forwarding determiner 105 causes the execution of fax transmission at the relay device able to execute the fax transmission soonest in terms of time from among all relay devices 1a to 1c, including the relay device 1a itself.

Note that in order to determine which device is able to execute fax transmission sooner than other devices, the forwarding determiner 105 may compare the number of fax transmission requests queued in the relay devices 1b and 1c, and may also make comparisons that account for the numbers of pages in each fax transmission request.

(3-4)

Also, as another example, the forwarding determiner 105 to request another relay device to execute fax transmission in the case of a situation in which fax transmission is unavailable due to factors such as a malfunction or communication error in the relay device 1a.

Furthermore, a communication error may be caused by the conditions of the physical lines connecting each of the relay devices 1a to 1c to external receiving devices set as destinations. For this reason, success rates of communication between each of the relay devices 1a to 1c and external receiving devices set as destinations may be computed from a past history, and these success rates may be used as a basis for determining which of the relay devices 1a to 1c to request.

Figure 5:
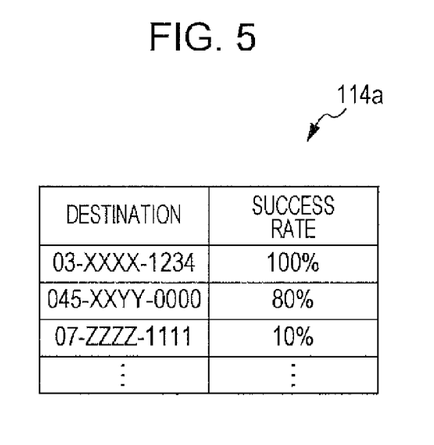
FIG. 5 is a diagram illustrating an example of success rates for communication between a relay device and respective destinations.

FIG. 5 is a diagram illustrating an example of success rates for communication between the relay device 1a and respective destinations.

The success rate information 114a is an example of success rate information 114, and is information indicating success rates computed from a history of previous fax transmissions between the relay device 1a and the destinations in the destination field.

Since the success rate of the relay device 1a is high for the destinations "03-XXXX-1234" and "045-XXYY-0000", the relay device 1a receives more fax transmission requests from another relay device 1b or 1c. Meanwhile, since the success rate is low for the destination "07-ZZZZ-1111", if there is another relay device with a high success rate, the relay device 1a requests the other relay device to execute fax transmission without executing fax transmission itself.

Note that the fax transmission requester 106 sends fax transmission requests in addition to executing fax transmission in the relay device 1a, and may also send communication parameters such as the transmit level, receive level, cable equalizer, and communication rate in the case of a failure as communication conditions. On the basis of these communication parameters, the relay device 1b or 1c receiving a request may be configured to select communication parameters so as to raise the success rate.

Other Exemplary Embodiments

Note that the present invention is not limited to the foregoing exemplary embodiment, and that various modifications are possible within a scope that does not depart from the principal matter of the present invention.

Furthermore, the foregoing fax transceiving programs 110 and 210 may also be provided by being stored on a storage medium such as a CD-ROM, or by being downloaded to memory inside a device from a device such as a server connected to a network such as the Internet. In addition, all or part of the respective units 100 to 106 and the respective units 200 to 204 may be realized by hardware such as an ASIC. Note that the order of the respective steps indicated in the operational description of the foregoing exemplary embodiment may also be modified, and steps may also be added or removed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay device comprising:
a receiver that receives facsimile transmission instructions via a private network from a client device that does not include facsimile transmitting functions;
a facsimile communication unit that transmits a facsimile externally via a public network, based on the facsimile transmission instructions received by the receiver;
a determiner that, based on the content of the facsimile transmission instructions received by the receiver, determines whether or not to request another device connected via the private network to execute facsimile transmission; and
a requester that, when the determiner determines to request the another device to execute facsimile transmission, sends a transmission request regarding some or all of the facsimile transmission instructions received by the receiver to the another device, wherein
the determiner determines whether to request the another device connected via the private network to execute facsimile transmission when the facsimile transmission instruction received by the receiver is a request to transmit facsimiles to a plurality of different destinations.

2. The relay device according to claim 1, wherein
the determiner determines whether or not to request another device connected via the private network to execute facsimile transmission on the basis of the content being a number of destinations in facsimile transmission instructions received by the receiver.

3. The relay device according to claim 1, wherein
the determiner determines whether or not to request another device connected via the private network to execute facsimile transmission on the basis of the content being a priority ranking set for destinations in facsimile transmission instructions received by the receiver.

4. The relay device according to claim 1, wherein
the determiner determines whether or not to request another device connected via the private network to execute facsimile transmission in the case where facsimile transmission by the facsimile communication unit according to facsimile transmission instructions received by the receiver results in a communication failure.

5. The relay device according to claim 4, wherein
in the case of a communication failure, the requester transmits the transmission request together with communication conditions regarding facsimile transmission by the facsimile communication unit.

6. A facsimile communication method comprising:
receiving facsimile transmission instructions via a private network from a client device that does not include facsimile transmitting functions;
transmitting a facsimile externally via a public network, based on the received facsimile transmission instructions;
determining, based on the content of the received facsimile transmission instructions, whether or not to request another device connected via the private network to execute facsimile transmission when the facsimile transmission instruction received by the receiver is a request to transmit facsimiles to a plurality of different destinations; and
when determining to request the another device to execute facsimile transmission, issuing a transmission request regarding some or all of the received facsimile transmission instructions to the another device.

7. A non-transitory computer readable medium storing a program causing a computer to execute a process for facsimile communication, the process comprising:
- receiving facsimile transmission instructions via a private network from a client device that does not include facsimile transmitting functions;
- transmitting a facsimile externally via a public network, based on the received facsimile transmission instructions;
- determining, based on the content of the received facsimile transmission instructions, whether or not to request another device connected via the private network to execute facsimile transmission when the facsimile transmission instruction received by the receiver is a request to transmit facsimiles to a plurality of different destinations; and
- when determining to request the another device to execute facsimile transmission, issuing a transmission request regarding some or all of the received facsimile transmission instructions to the another device.

* * * * *